United States Patent
Lee et al.

(10) Patent No.: US 11,821,515 B2
(45) Date of Patent: Nov. 21, 2023

(54) SYSTEM AND METHOD OF CONTROLLING SHIFT MECHANISM FOR VEHICLE

(71) Applicants: Hyundai Motor Company, Seoul (KR); Kia Corporation, Seoul (KR); SL Corporation, Daegu (KR)

(72) Inventors: Sung Hoon Lee, Seoul (KR); Ki Young Song, Suwon-Si (KR); Sung Hun Um, Gyeongsan-Si (KR); Sang Jin Meun, Gyeongsan-Si (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 108 days.

(21) Appl. No.: 17/527,080

(22) Filed: Nov. 15, 2021

(65) Prior Publication Data
US 2022/0390011 A1 Dec. 8, 2022

(30) Foreign Application Priority Data
Jun. 3, 2021 (KR) .................. 10-2021-0072299

(51) Int. Cl.
*F16H 63/42* (2006.01)
*F16H 59/70* (2006.01)
*F16H 61/24* (2006.01)

(52) U.S. Cl.
CPC ............. *F16H 63/42* (2013.01); *F16H 59/70* (2013.01); *F16H 2061/241* (2013.01)

(58) Field of Classification Search
CPC ..... F16H 63/42; F16H 59/70; F16H 2061/241
See application file for complete search history.

(56) References Cited

U.S. PATENT DOCUMENTS

| | | | |
|---|---|---|---|
| 5,674,153 A | 10/1997 | Jang | |
| 8,464,601 B2 | 6/2013 | Giefer et al. | |
| 2002/0157492 A1* | 10/2002 | Hayashi | F16H 61/18 |
| | | | 74/336 R |
| 2009/0000413 A1* | 1/2009 | Furhoff | G05G 5/03 |
| | | | 74/473.12 |
| 2017/0120930 A1* | 5/2017 | Ling | B60W 50/10 |

(Continued)

FOREIGN PATENT DOCUMENTS

| | | | |
|---|---|---|---|
| DE | 102011007641 A1 * | 10/2012 | ........... F16H 59/044 |
| JP | 3725664 | 12/2005 | |

(Continued)

*Primary Examiner* — David R Morris
(74) *Attorney, Agent, or Firm* — MORGAN, LEWIS & BOCKIUS LLP

(57) ABSTRACT

A system and method of controlling a shift mechanism for a vehicle, includes a shift determination unit configured to determine information on a shifting stage of the vehicle according to an operation of the shift mechanism; and a control unit configured to receive the information on the shifting stage from the shift determination unit and to transmit a signal such that vibration is generated in the shift mechanism when the shifting stage switched by operation of the shift mechanism is a drivable shifting stage, wherein when a driver operates the shift mechanism to switch a shifting stage to a drivable shifting stage, a signal according to the corresponding shifting stage is transmitted to enable the driver to recognize the switched shifting stage and thus to prevent erroneous operation, ensuring driving safety.

9 Claims, 4 Drawing Sheets

(56) References Cited

U.S. PATENT DOCUMENTS

2018/0363769 A1\* 12/2018 Nilsson .................. F16H 61/24
2019/0202460 A1    7/2019 Ishikawa et al.

FOREIGN PATENT DOCUMENTS

| JP | 2008-309184 | 12/2008 |
| KR | 20-1995-0006998 Y1 | 8/1995 |
| KR | 10-0517710 | 9/2005 |
| KR | 10-2010-0101330 | 9/2010 |
| KR | 10-1534918 | 7/2015 |

\* cited by examiner

SYSTEM AND METHOD OF CONTROLLING SHIFT MECHANISM FOR VEHICLE

CROSS-REFERENCE TO RELATED APPLICATION

The present application claims priority to Korean Patent Application No. 10-2021-0072299, filed on Jun. 3, 2021, the entire contents of which is incorporated herein for all purposes by this reference.

BACKGROUND OF THE INVENTION

Field of the Invention

The present invention relates to a system and method of controlling a shift mechanism for a vehicle, wherein the system and method prevent erroneous operation during operation of the shift mechanism.

Description of Related Art

In general, a shift mechanism of a vehicle has a function of transmitting the driving force of the engine to the driving wheels. Such shift mechanisms are generally classified into a manual shift mechanism in which a driver directly selects a shifting stage by his or her intension, an automatic shift mechanism in which shifting occurs automatically according to the driving conditions of the vehicle, and a continuously variable shift mechanism in which there is no specific region between respective shifting stage and continuous shifting occurs in a stepless manner.

Here, the automatic shift mechanism is an apparatus that automatically and appropriately converts a gear ratio while driving according to driving conditions. The automatic shift mechanism not only improves driving convenience by reducing the burden of shifting while driving, but also improves riding comfort through smooth execution of start, acceleration, and deceleration.

In a vehicle provided with such an automatic shift mechanism, a shift mechanism that allows the driver to artificially change a shift mode according to driving conditions is installed, and the driver operates the shift mechanism to select a parking mode, a reverse mode, a neutral mode, and a drive mode according to the driving situation.

Recently, as the electronic shift mechanism is applied, the shift mechanism is applied in various ways, such as a lever type, a button type, and a dial type. However, in the case of the electronic shift mechanism, when a driver performs shifting to a specific shifting stage, an erroneous operation may occur, and a driving accident may occur when the driver misrecognizes the shift mechanism and erroneously operates the shift mechanism.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method of controlling a shift mechanism for a vehicle, in which, when a driver shifts to a specific shifting stage by operating the shift mechanism, a signal according to the corresponding shifting stage is transmitted such that the shifting stage shifted by the driver is recognized, preventing erroneous operation and ensuring driving safety.

In view of the foregoing, various aspects of the present invention provide a system of controlling a shift mechanism for a vehicle, wherein the shift mechanism is configured to vibrate when a signal is input thereto. The system includes: a shift determination unit configured to determine information on a shifting stage of the vehicle according to an operation of the shift mechanism; and a control unit configured to receive the information on the shifting stage from the shift determination unit and to transmit a signal to an actuator so that the actuator generates the vibration in the shift mechanism when the control unit determines that the shifting stage switched by operation of the shift mechanism is a drivable shifting stage.

The shift mechanism has a shift pattern of a P stage position, an R stage position, an N stage position, and a D stage position, and is configured to return to a null position again when moved to the R stage, the N stage (Nr stage, Nd stage), or the D stage.

When the shift determination unit determines that the shifting stage is switched to an R stage through operation of the shift mechanism, the control unit is configured to transmit a signal to the actuator so that the shift mechanism vibrates.

When the shift mechanism is re-operated to the R stage in a state in which a current shifting stage is the R stage, the control unit is configured to transmit a signal to the actuator so that vibration is generated in the shift mechanism.

When the shift mechanism is re-operated to the R stage in a state in which the current shifting stage is the R stage, the control unit is configured to transmit a signal to the actuator so that the shift mechanism vibrates in a pattern different from a vibration pattern at a time of initial shifting to the R stage.

When the shift determination unit determines that a shifting stage is switched to a D stage through operation of the shift mechanism, the control unit is configured to transmit a signal to the actuator so that the shift mechanism vibrates.

When the shift mechanism is re-operated to the D stage in a state in which a current shifting stage is the D stage, the control unit is configured to transmit a signal to the actuator so that vibration is generated in the shift mechanism.

When the shift mechanism is re-operated to the D stage in a state in which the current shifting stage is the D stage, the control unit is configured to transmit a signal such that the shift mechanism vibrates in a pattern different from a vibration pattern at a time of initial shifting to the R stage.

The shift mechanism has a plurality of vibration patterns, and the control unit is configured to transmit different signals to the actuator for a case where the shift mechanism is operated to the R stage and a case where the shift mechanism is operated to the D stage, respectively so that the shift mechanism vibrates in different vibration patterns according to respective signals.

Meanwhile, a method of controlling a shift mechanism according to various exemplary embodiments of the present invention includes: a shift determination operation of determining information on a shifting stage of the vehicle according to an operation of the shift mechanism; and a control operation of receiving the information on the shifting stage from a shift determination unit and transmitting a signal so that vibration is generated in the shift mechanism when the control unit determines that the shifting stage switched by operation of the shift mechanism is a drivable shifting stage.

In the control operation, when the shift determination unit determines that the shifting stage is switched to an R stage through operation of the shift mechanism, a signal is transmitted to the shift mechanism so that the shift mechanism vibrates.

In the control operation, when the shift mechanism is re-operated to the R stage in a state in which a current shifting stage is the R stage, a signal is transmitted so that vibration is generated in the shift mechanism.

In the control operation, when the shift mechanism is re-operated to the R stage in a state in which the current shifting stage is the R stage, a signal is transmitted so that the shift mechanism vibrates in a pattern different from a vibration pattern at a time of initial shifting to the R stage.

In the control operation, when the shift determination unit determines that a shifting stage is switched to a D stage through operation of the shift mechanism, a signal is transmitted to the shift mechanism so that the shift mechanism vibrates.

In the control operation, when the shift mechanism is re-operated to the D stage in a state in which a current shifting stage is the D stage, a signal is transmitted so that vibration is generated in the shift mechanism.

In the control operation, when the shift mechanism is re-operated to the D stage in a state in which the current shifting stage is the D stage, a signal is transmitted so that the shift mechanism vibrates in a pattern different from a vibration pattern at a time of initial shifting to the D stage.

In the control operation, different signals are transmitted for a case where the shift mechanism is operated to the R stage and a case where the shift mechanism is operated to the D stage, respectively so that the shift mechanism vibrates in different vibration patterns according to respective signals.

With a system and method for controlling a shift mechanism for a vehicle configured as described above, when a driver operates the shift mechanism to switch a shifting stage to a drivable shifting stage, a signal according to the corresponding shifting stage is transmitted to enable the driver to recognize the switched shifting stage and thus to prevent erroneous operation, ensuring driving safety.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
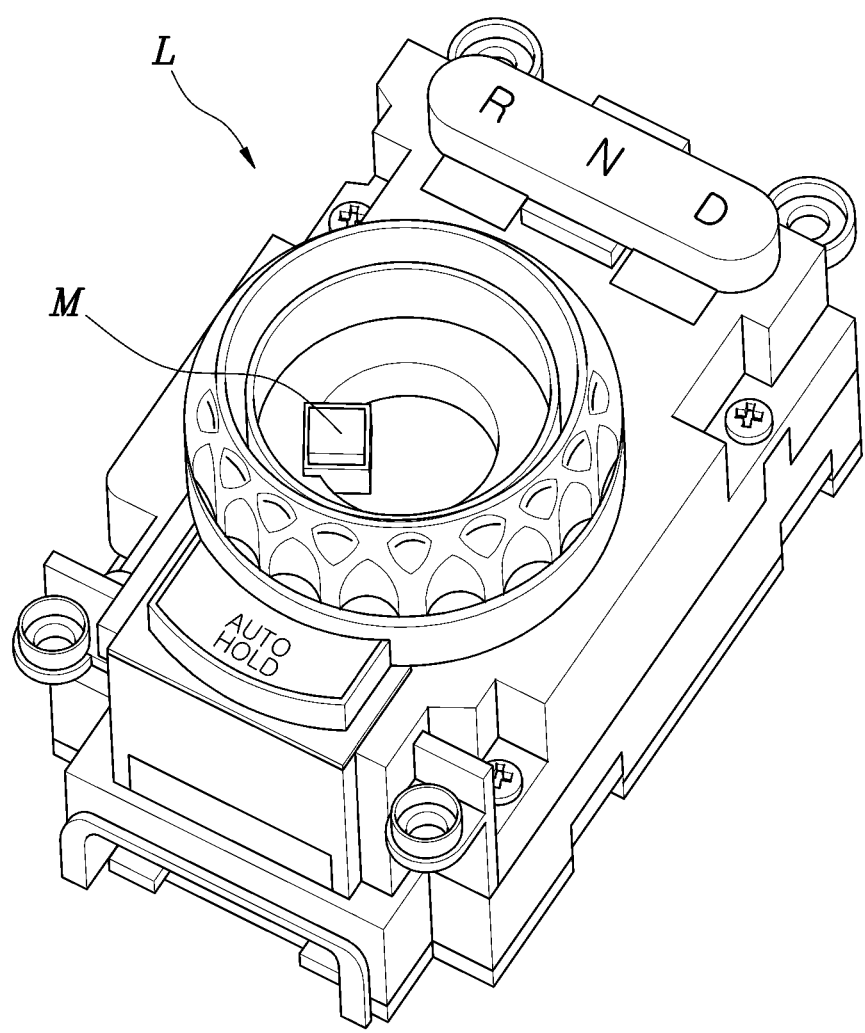
FIG. 1 is a view exemplarily illustrating a shift mechanism for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a system and method of controlling a shift mechanism for a vehicle according to various exemplary embodiments of the present invention will be described with reference to the accompanying drawings.

Figure 2:
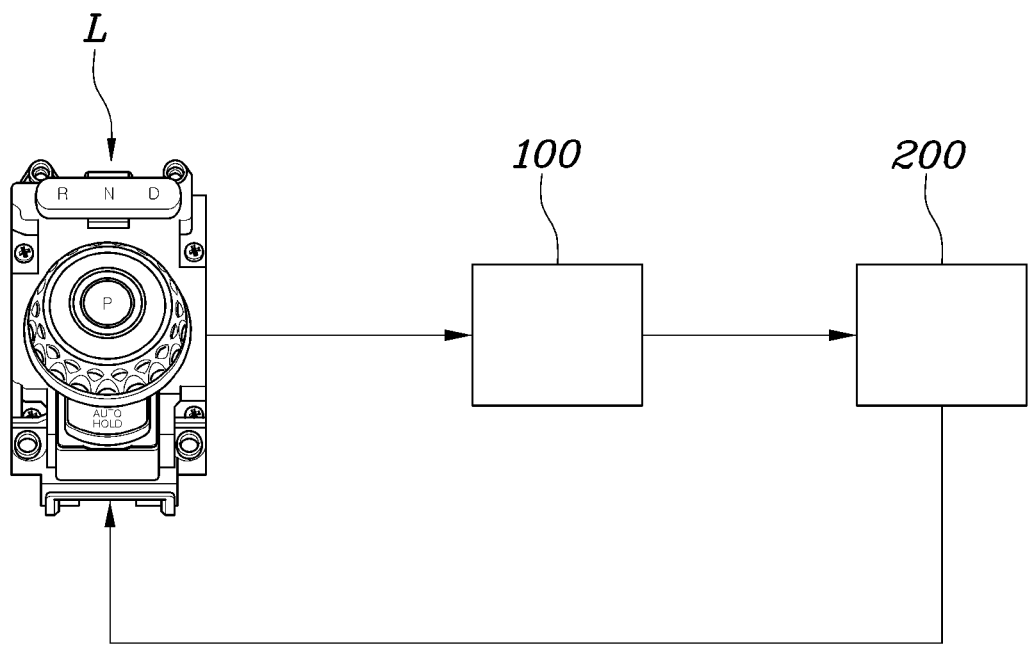
FIG. 2 is a view exemplarily illustrating the configuration of a system of controlling the shift mechanism for a vehicle illustrated in FIG. 1.
Figure 3:
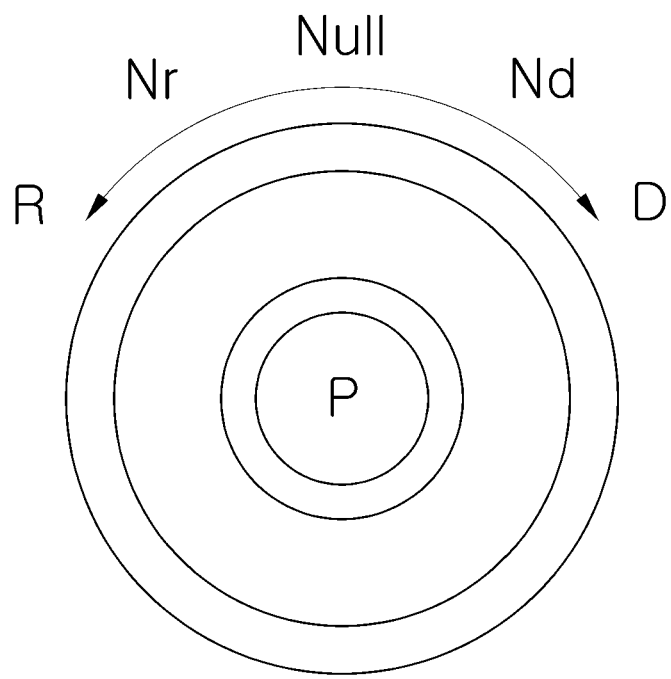
FIG. 3 is a view for describing the system of controlling the shift mechanism for a vehicle illustrated in FIG. 1.
Figure 4:
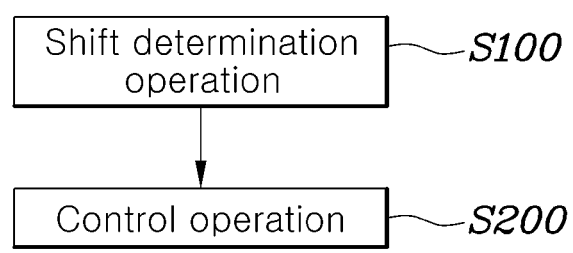
FIG. 4 and FIG. 5 are flowcharts of controlling the shift mechanism for a vehicle according to various exemplary embodiments of the present invention.
Figure 5:
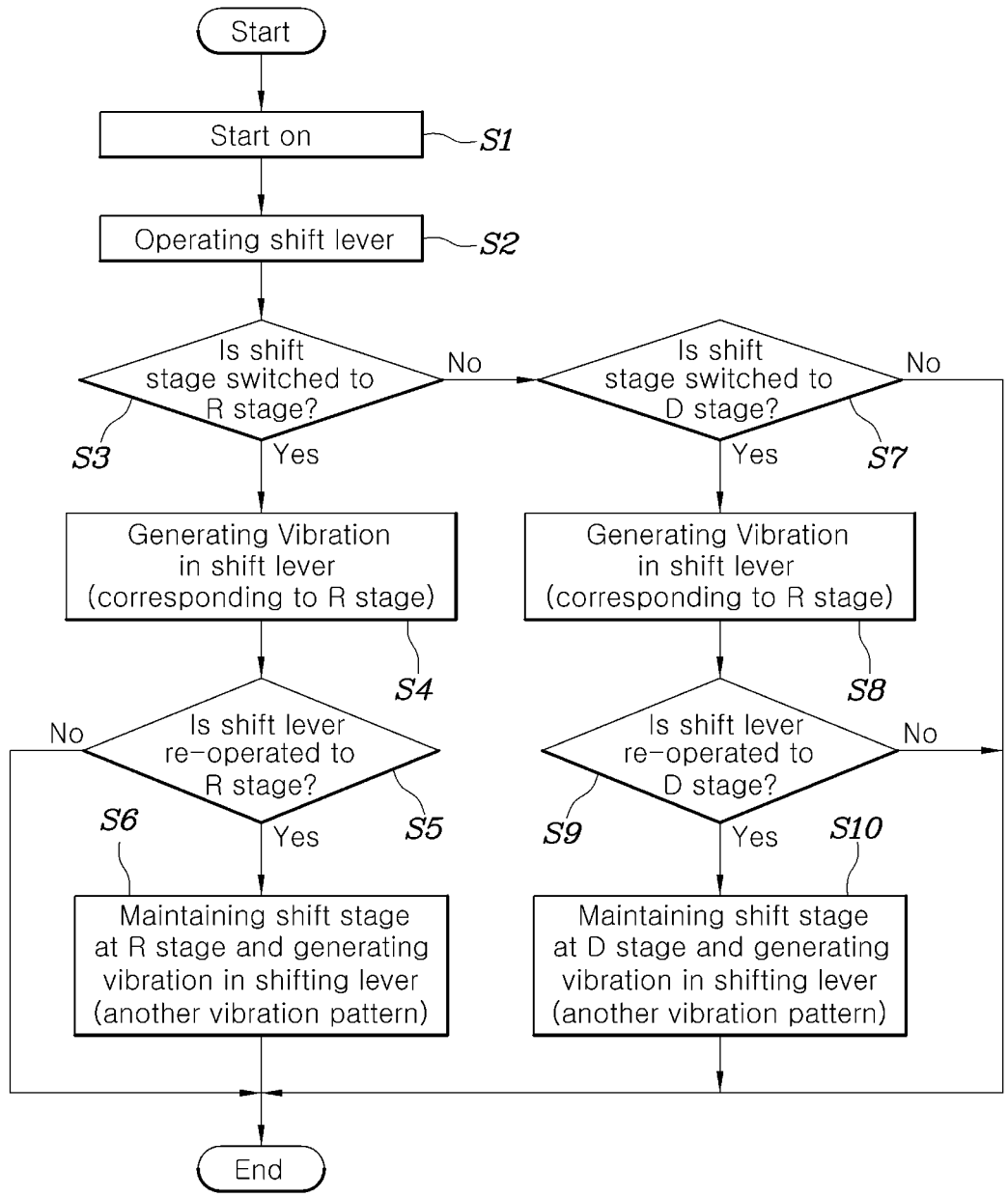

FIG. 1 is a view exemplarily illustrating a shift mechanism for a vehicle according to various exemplary embodiments of the present invention, FIG. 2 is a view exemplarily illustrating the configuration of a system of controlling the shift mechanism for a vehicle illustrated in FIG. 1, FIG. 3 is a view for describing the system of controlling the shift mechanism for a vehicle illustrated in FIG. 1, and FIG. 4 and FIG. 5 are flowcharts of a method of controlling the shift mechanism for a vehicle according to various exemplary embodiments of the present invention.

The shift mechanism according to various exemplary embodiments of the present invention is configured to generate vibration when a signal is input thereto. Such a shift mechanism is applicable in various forms, such as a lever type, a dial type, a button type, and a column type, and as vibration occurs in the shift mechanism, a message may be delivered to the driver through the vibration of the shift mechanism. For example, as may be seen from FIG. 1, vibration generated by a haptic motor M provided in a shift mechanism L may be transmitted to the shift mechanism L.

Furthermore, the shift mechanism L has a shift pattern of a P stage position, an R stage position, an N stage position, and a D stage position, and is configured to return to a null position again when moved to the R stage, the N stage (Nr stage, Nd stage), or the D stage.

That is, as illustrated in FIG. 3, when the shift mechanism L is rotated by one space clockwise from the null position, the Nd stage is selected, when the shift mechanism L is further rotated by one space clockwise from the Nd stage, the D stage is selected, and when the shift mechanism L is rotated by one space counterclockwise from the null position, the Nr stage is selected, and when the shift mechanism L is further rotated by one space counterclockwise from the Nr stage, the R stage is selected. In the present way, when the operation force is released after the operation of the shift mechanism L, the shift mechanism may be returned to the null position from the R stage, the N stage (Nr stage, Nd stage) or the D-stage by a return device provided therein.

However, in the case of an electronic shift mechanism, there is a possibility of erroneous operation of the shift mechanism since the shift mechanism returns to the null position from the R stage, the N (Nr stage, Nd stage) or the D stage. In various exemplary embodiments of the present invention, when a driver shifts to the R stage or the D stage, which is a drivable shifting stage, a message according to the shifting of the shifting stage is transmitted using the vibration of the shift mechanism, preventing the shifting stage selected by the driver from being misrecognized and erroneously operated.

In view of the foregoing, according to various exemplary embodiments of the present invention, as illustrated in FIG. 1 and FIG. 2, a shift mechanism L, in which vibration is selectively generated, includes: a shift determination unit 100 configured to determine information on a shifting stage of the vehicle according to an operation of the shift mechanism; and a control unit 200 configured to receive the information on the shifting stage from the shift determination unit 100 and to transmit a signal to an actuator so that the actuator generates the vibration in the shift mechanism when the control unit determines that the shifting stage switched by operation of the shift mechanism is a drivable shifting stage.

The shift determination unit 100 and the control unit 200 are configured as SBW Control Units (SCUs) to be configured for determining information according to the shaft stage switched by the operation of the shift mechanism L, and are configured for collecting information according to the current shifting stage using a transmission control unit (TCU)/a vehicle control unit (VCU).

Accordingly, the control unit 200 receives information on the shifting stage through the shift determination unit 100, and controls the shift mechanism according to the information on the shifting stage. That is, when the shifting stage is switched to a drivable shifting stage through operation of the shift mechanism according to the driver's intention, the control unit 200 transmits a signal to the shift mechanism such that vibration is generated in the shift mechanism.

When a shift signal according to the operation of the shift mechanism is transmitted to the SCU, the SCU transmits the corresponding shift signal to the TCU, and when the shifting stage of the shift is switched by the TCU, an actual shift signal according to the switching of the shifting stage is fed back to the SCU. When the actual shift signal transmitted through the TCU matches a drivable shifting stage, the SCU performs control such that the vibration is generated.

Here, the drivable shifting stage is the R stage or the D stage, and the control unit 200 transmits a signal such that vibration is generated in the shift mechanism when the shifting stage has been switched to the R stage or the D stage, facilitating the driver to recognize that the shifting stage is switched to a drivable shifting stage and thus preventing accidents caused by erroneous operation Furthermore, the intensity and pattern of the vibration generated in the shift mechanism may be determined at the initial design stage for the shift mechanism, and may be changed to the intensity and pattern of the vibration requested by the driver, so that the driver recognizes and determines the vibration generated from the shift mechanism, preventing erroneous operation of the shift mechanism.

As described above, in various exemplary embodiments of the present invention, vibration is generated in the shift mechanism when the driver operates the shift mechanism and shifts to a drivable shifting stage. Therefore, when shifting to a shifting stage where a driving accident may occur due to the driver's misrecognition, it is possible to prevent accidents due to erroneous operation of the shift mechanism through transmission of a warning message through the vibration of the shift mechanism.

The present invention will now be described in detail. When the shift determination unit 100 determines that the shifting stage has been switched to the R stage through operation of the shift mechanism, the controller 200 transmits a signal to the shift mechanism such that the shift mechanism vibrates.

In the present way, when the driver operates the shift mechanism to shift to the R stage, the controller 200 transmits a signal to the shift mechanism such that the shift mechanism vibrates to enable the driver to recognize that the shifting stage has been switched to the R stage.

In the present way, when the shifting stage has been switched to the R stage from another shifting stage corresponding to the P stage, the N stage, or the D stage through the driver's operation of the shift mechanism, the control unit 200 is configured to cause vibration to be generated in the shift mechanism, facilitating the driver to recognize that the shifting stage has been switched to the R stage and to control the driving accordingly.

Meanwhile, when the shift mechanism is re-operated to the R stage in the state in which the current shifting stage is the R stage, the control unit 200 transmits a signal such that vibration is generated in the shift mechanism.

That is, when the shift mechanism is re-operated to the R stage in the state in which the current shifting stage is the R stage, the control unit determines that the driver does not recognize the current shifting stage or erroneously operates the shift mechanism and transmits a signal such that vibration is generated in the shift mechanism.

In the present way, since vibration is generated in the shift mechanism when the shift mechanism is re-operated to the R stage in the state in which the current shifting stage is the R stage, the driver is configured to recheck the current shifting stage and to accurately shift to the intended shifting stage.

Furthermore, when the shift mechanism is re-operated to the R stage in the state in which the current shifting stage is the R stage, the control unit 200 transmits a signal such that the shift mechanism vibrates in a pattern different from the vibration pattern at the time of initial shifting to the R stage.

That is, when the shift mechanism is re-operated to the R stage in the state in which the current shifting stage is the R stage, it is determined that the driver does not recognize the current shifting stage or erroneously operates the shift mechanism. Thus, when the shift mechanism is re-operated to the R stage, the control unit 200 enables the driver to recognize re-shifting to the same shifting stage by causing the shift mechanism to vibrate in a vibration pattern different from the vibration pattern at the time of initial shifting to the R stage.

For example, the vibration pattern of the shift mechanism at the time of re-shifting to the R stage may be made to be stronger than the vibration pattern of the shift mechanism at the time of initial shifting to the R stage or the vibration pattern at the time of re-shifting to the R stage may be repeated such that the driver can recognize erroneous operation when erroneously operating the shift mechanism.

When the shift determination unit 100 determines that the shifting stage has been switched to the D stage through operation of the shift mechanism, the controller 200 transmits a signal to the shift mechanism such that the shift mechanism vibrates.

In the present way, when the shifting stage is switched to the D stage from another shifting stage corresponding to the P stage, the N stage, or the R stage through the driver's operation of the shift mechanism, the control unit 200 is configured to cause vibration to be generated in the shift mechanism, facilitating the driver to recognize that the shifting stage has been switched to the D stage and to control the driving accordingly.

Meanwhile, when the shift mechanism is re-operated to the D stage in the state in which the current shifting stage is the D stage, the control unit 200 transmits a signal such that vibration is generated in the shift mechanism.

That is, when the shift mechanism is re-operated to the D stage in the state in which the current shifting stage is the D stage, the control unit 200 determines that the driver does not recognize the current shifting stage or erroneously operates the shift mechanism and transmits a signal such that vibration is generated in the shift mechanism.

In the present way, since vibration is generated in the shift mechanism when the shift mechanism is re-operated to the D stage in the state in which the current shifting stage is the D stage, the driver is able to recheck the current shifting stage and to accurately shift to the intended shifting stage.

Furthermore, when the shift mechanism is re-operated to the D stage in the state in which the current shifting stage is the D stage, the control unit 200 transmits a signal to the shift mechanism such that the shift mechanism vibrates in a pattern different from a vibration pattern at a time of initial shifting to the D stage.

That is, when the shift mechanism is re-operated to the D stage in the state in which the current shifting stage is the D stage, it is determined that the driver does not recognize the current shifting stage or erroneously operates the shift mechanism. Thus, when the shift mechanism is re-operated to the D-stage, the control unit 200 enables the driver to recognize re-shifting to the same shifting stage by causing the shift mechanism to vibrate in a vibration pattern different from a vibration pattern at a time of initial shifting to the D stage.

For example, the vibration pattern of the shift mechanism at the time of re-shifting to the D stage may be made to be stronger than the vibration pattern of the shift mechanism at the time of initial shifting to the D stage or the vibration pattern at the time of re-shifting to the D stage may be repeated such that the driver can recognize erroneous operation when erroneously operating the shift mechanism.

Meanwhile, the shift mechanism may be configured to have a plurality of vibration patterns. That is, the shift mechanism may implement a plurality of vibration patterns by varying the frequency of vibration.

Accordingly, the control unit 200 transmits different signals for the case where the shift mechanism is operated to the R stage and the case where the shift mechanism is operated to the D stage, respectively such that the shift mechanism vibrates in different vibration patterns according to respective signals.

As described above, since the vibration pattern generated when the shift mechanism is operated to the R stage is different from that generated when the shift mechanism is operated to the D stage, it is possible for the driver to accurately recognize the shifting stage selected when the shift mechanism is operated.

Meanwhile, as illustrated in FIG. 4 and FIG. 5, a method of controlling a shift mechanism according to various exemplary embodiments of the present invention includes: a shift determination operation (S100) of determining information on a shifting stage of the vehicle according to an operation of the shift mechanism; and a control operation (S200) of receiving the information on the shifting stage through the shift determination operation (S100) and transmitting a signal so that vibration is generated in the shift mechanism when the shifting stage switched by operation of the shift mechanism is a drivable shifting stage.

In the shift determination operation (S100), information according to the current shifting stage and information according to the shifting stage switched as the shift mechanism is operated are determined using a transmission control unit (TCU), an SBW control unit (SCU), and/or a vehicle control unit (VCU).

Accordingly, in the control unit (S200), information on the shifting stage is received through the shift determination operation (S100), and the shift mechanism is controlled according to the information on the shifting stage. That is, in the control operation (S200), when the shifting stage is switched to a drivable shifting stage through operation of the shift mechanism according to the driver's intention, a signal is transmitted to the shift mechanism such that vibration is generated in the shift mechanism. Here, the drivable shifting stage is the R stage or the D stage, and the control unit 200 transmits a signal to the shift mechanism such that vibration is generated in the shift mechanism when the shifting stage is switched to the R stage or the D stage, facilitating the driver to recognize that the shifting stage is switched to a drivable shifting stage and thus preventing accidents caused by erroneous operation In the control operation (S200), when it is determined that the shifting stage is switched to the R stage through operation of the shift mechanism, a signal is transmitted to the shift mechanism such that the shift mechanism vibrates.

In the present way, in the control operation (S200), when the driver operates the shift mechanism to shift to the R stage, a signal is transmitted to the shift mechanism such that the shift mechanism vibrates to enable the driver to recognize that the shifting stage has been switched to the R stage.

In the present way, when the shifting stage is switched to the R stage from another shifting stage corresponding to the P stage, the N stage, or the D stage through the driver's operation of the shift mechanism, the control unit 200 is configured to cause vibration to be generated in the shift mechanism, facilitating the driver to recognize that the shifting stage has been switched to the R stage and to control the driving accordingly.

Meanwhile, in the control operation (S200), when the shift mechanism is re-operated to the R stage in the state in which the current shifting stage is the R stage, a signal is transmitted to generate vibration in the shift mechanism.

That is, when the shift mechanism is re-operated to the R stage in the state in which the current shifting stage is the R stage, the control unit 200 determines that the driver does not recognize the current shifting stage or erroneously operates the shift mechanism and transmits a signal such that vibration is generated in the shift mechanism.

In the present way, since vibration is generated in the shift mechanism when the shift mechanism is re-operated to the R stage in the state in which the current shifting stage is the R stage, the driver is able to recheck the current shifting stage and to accurately shift to the intended shifting stage.

Furthermore, in the control step (S200), when the shift mechanism is re-operated to the R stage in the state in which the current shifting stage is the R stage, a signal is transmitted to the shift mechanism such that the shift mechanism vibrates in a pattern different from the vibration pattern at the time of initial shifting to the R stage.

That is, when the shift mechanism is re-operated to the R stage in the state in which the current shifting stage is the R stage, it is determined that the driver does not recognize the current shifting stage or erroneously operates the shift mechanism. Thus, when the shift mechanism is re-operated to the R stage, the control unit 200 enables the driver to recognize re-shifting to the same shifting stage by causing the shift mechanism to vibrate in a vibration pattern different from the vibration pattern at the time of initial shifting to the R stage.

Meanwhile, in the control operation (S200), when the shift determination unit 100 determines that the shifting stage has been switched to the D stage through operation of the shift mechanism, a signal is transmitted to the shift mechanism such that the shift mechanism vibrates.

In the present way, in the control operation (S200), when the driver operates the shift mechanism to shift to the D stage, a signal is transmitted to the shift mechanism such that the shift mechanism vibrates to enable the driver to recognize that the shifting stage has been switched to the D stage.

Furthermore, in the control operation (S200), when the shift mechanism is re-operated to the D stage in the state in which the current shifting stage is the D stage, a signal is transmitted to generate vibration in the shift mechanism.

In the present way, since vibration is generated in the shift mechanism when the shift mechanism is re-operated to the D stage in the state in which the current shifting stage is the D stage, the driver is able to recheck the current shifting stage and to accurately shift to the intended shifting stage.

Furthermore, in the control operation (S200), when the shift mechanism is re-operated to the D stage in the state in which the current shifting stage is the D stage, a signal is transmitted such that the shift mechanism vibrates in a pattern different from a vibration pattern at a time of initial shifting to the D stage.

That is, when the shift mechanism is re-operated to the D stage in the state in which the current shifting stage is the D stage, it is determined that the driver does not recognize the current shifting stage or erroneously operates the shift mechanism. Thus, when the shift mechanism is re-operated to the D-stage, the control unit 200 enables the driver to recognize re-shifting to the same shifting stage by causing the shift mechanism to vibrate in a vibration pattern different from a vibration pattern at a time of initial shifting to the D stage.

Meanwhile, in the control operation (S200), different signals are transmitted for the case where the shift mechanism is operated to the R stage and the case where the shift mechanism is operated to the D stage, respectively such that the shift mechanism vibrates in different vibration patterns according to respective signals.

As described above, since the vibration pattern generated when the shift mechanism is operated to the R stage is different from that generated when the shift mechanism is operated to the D stage, it is possible for the driver to accurately recognize the shifting stage selected when the shift mechanism is operated.

As described above, according to various exemplary embodiments of the present invention, it is possible to selectively control vibration generation in the shift mechanism through the control according to operations S1 to S10 of FIG. 5.

For the present reason, according to various exemplary embodiments of the present invention, when a driver operates the shift mechanism to switch a shifting stage to a drivable shifting stage, a signal according to the corresponding shifting stage is transmitted to enable the driver to recognize the switched shifting stage and thus to prevent erroneous operation, ensuring driving safety.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system of controlling a shift mechanism for a vehicle to generate vibration when a signal is input thereto, the system comprising:
a shift determination unit configured to determine information on a shifting stage of the vehicle according to an operation of the shift mechanism; and
a control unit configured to receive the information on the shifting stage from the shift determination unit and to transmit a signal to an actuator so that the actuator generates the vibration in the shift mechanism when the control unit determines that the shifting stage switched by operation of the shift mechanism is a drivable shifting stage,
wherein the shift mechanism is configured to implement a plurality of vibration patterns by varying frequency of vibration, and configured to generate and change a pattern of the vibration,
wherein, when the shift determination unit determines that the shifting stage is switched to an R or D stage through operation of the shift mechanism, the control unit is configured to transmit a signal to the actuator so that the shift mechanism vibrates, and
wherein, when the shift mechanism is re-operated to a same stage as a state in which a current shifting stage is the R or D stage, the control unit is configured to transmit a signal to a actuator so that the shift mechanism vibrates in a pattern different from a vibration pattern at a time of initial shifting to the R or D stage.

2. The system of claim 1, wherein the shift mechanism has a shift pattern of a P stage position, an R stage position, an N stage position, and a D stage position, and is configured to return to a null position again when moved to the R stage position, the N stage position, or the D stage position.

3. The system of claim 1,
wherein the control unit is configured to transmit different signals to the actuator for a case where the shift mechanism is operated to the R stage and a case where the shift mechanism is operated to the D stage, respectively so that the shift mechanism vibrates in different vibration patterns according to respective signals.

4. A method of controlling a shift mechanism for a vehicle to generate vibration when a signal is input thereto, the method including:
a shift determination operation of determining, by a shift determination unit, information on a shifting stage of the vehicle according to an operation of the shift mechanism; and
a control operation of receiving, by a control unit, the information on the shifting stage from the shift determination unit and transmitting a signal to an actuator so that the actuator generates vibration in the shift mechanism when the control unit determines that the shifting stage switched by operation of the shift mechanism is a drivable shifting stage,
wherein the shift mechanism is configured to implement a plurality of vibration patterns by varying frequency of vibration, and configured to generate and change a pattern of the vibration,
wherein, in the control operation, when the shift determination unit determines that the shifting stage is switched to an R or D stage through operation of the shift mechanism, the signal is transmitted by the control unit to the actuator so that the shift mechanism vibrates, and
wherein, in the control operation, when the shift mechanism is re-operated to the R or D stage in a state in which a current shifting stage is the R or D stage, a signal is transmitted to the actuator by the control unit so that the shift mechanism vibrates in a pattern different from a vibration pattern at a time of initial shifting to the R or D stage.

5. The method of claim 4, wherein, in the control operation, different signals are transmitted to the actuator for a case where the shift mechanism is operated to the R stage and a case where the shift mechanism is operated to the D stage, respectively so that the shift mechanism vibrates in different vibration patterns according to respective signals.

6. A non-transitory computer readable storage medium on which a program for performing the method of claim 4 is recorded.

7. A system of controlling a shift mechanism for a vehicle to generate vibration when a signal is input thereto, the system comprising:
a shift determination unit configured to determine information on a shifting stage of the vehicle according to an operation of the shift mechanism; and
a control unit configured to receive the information on the shifting stage from the shift determination unit and to transmit a signal to an actuator so that the actuator generates the vibration in the shift mechanism when the control unit determines that the shifting stage switched by operation of the shift mechanism is a drivable shifting stage,
wherein the shift mechanism is configured to implement a plurality of vibration patterns by varying frequency of vibration, and configured to generate and change a pattern of the vibration,
wherein, when the shift determination unit determines that the shifting stage is switched to an R or D stage through operation of the shift mechanism, the control unit is configured to transmit a signal to the actuator so that the shift mechanism vibrates, and
wherein, when the shift mechanism is re-operated to a same stage as a state in which a current shifting stage is the R or D stage, the control unit is configured to transmit a signal to the actuator so that vibration is generated in the shift mechanism.

8. The system of claim 7, wherein the shift mechanism has a shift pattern of a P stage position, an R stage position, an N stage position, and a D stage position, and is configured to return to a null position again when moved to the R stage position, the N stage position, or the D stage position.

9. The system of claim 7, wherein the control unit is configured to transmit different signals to the actuator for a case where the shift mechanism is operated to the R stage and a case where the shift mechanism is operated to the D stage, respectively so that the shift mechanism vibrates in different vibration patterns according to respective signals.

* * * * *